Aug. 26, 1952   W. T. MARCHMENT ET AL   2,608,678
ELECTRICAL CONTROLLING APPARATUS
Filed March 14, 1949
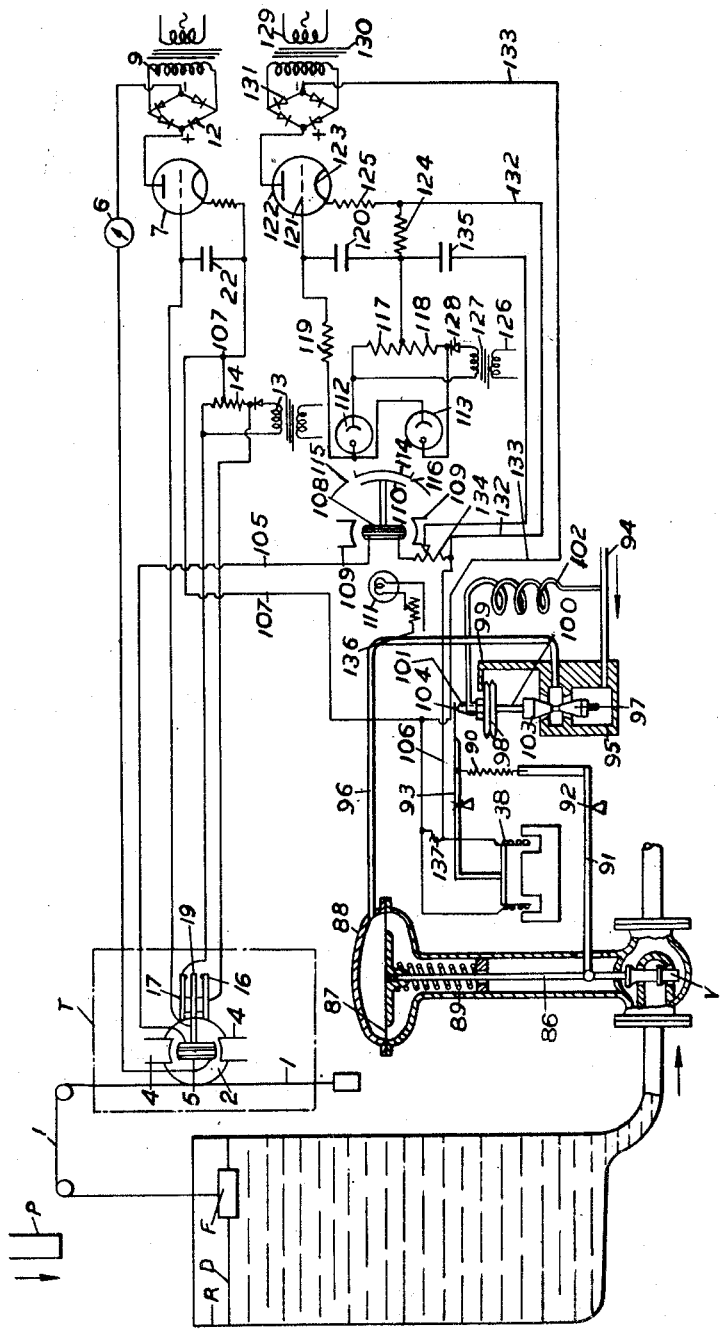
Inventors
William T. Marchment
James R. Boundy
Stephen A. Bergen
By Ralph B. Stewart
Attorney Patented Aug. 26, 1952

2,608,678

UNITED STATES PATENT OFFICE 2,608,678

ELECTRICAL CONTROLLING APPARATUS

William Thomas Marchment, James Reilly Boundy, and Stephen Archbold Bergen, Chiswick, London, England, assignors to Evershed and Vignoles Limited, London, England, a company of Great Britain Application March 14, 1949, Serial No. 81,352
In Great Britain March 15, 1948

14 Claims. (Cl. 318—456)

This invention relates to electrically-actuated apparatus for controlling physical quantities which are subject to variation. In general, therefore, the invention is concerned with controllers for use in maintaining a system in a state of equilibrium, and which are brought into operation by a departure from a datum value of some physical quantity whose value is determined by the state of the system. Such controllers are usually arranged to control the operation of a power receiver which is set to restore the equilibrium of the system. Such controllers may be used for controlling physical quantities of various kinds as, for example, for maintaining a liquid level, a temperature, a pressure or a degree of humidity in a state of equilibrium and in some kinds of controllers, actually at or close to a datum value. The power receiver may control an element such as a valve for controlling the inflow or outflow of a liquid or of a moist gas or of a pressure medium, but it may also control the setting of other elements such as a controller of electric current for variable heating and so forth.

In order to fix ideas, it is convenient to consider the conditions arising in a controller of liquid level. If a controller is designed to effect a setting of the controlled element, for example, a valve controlling the outflow of liquid from a tank which is adjusted at all times by an amount proportional to the amount of departure from a datum level and no other factors are utilised, it is clear that the controller cannot maintain the datum level because if the inflow to the tank is increased causing the level to rise, the controller is actuated in proportion to that rise in level and has to maintain the outlet valve to produce equilibrium despite the increased rate of inflow and as the action of the controller is proportional to the increase in level, it can only establish a new state of equilibrium in the system with a new datum at a higher level; similarly, if the inflow is decreased such a controller can only establish new equilibrium at a lower datum level. Such a form of controller is usually now known as a proportional controller.

If it is required to restore the level of the liquid to the original datum level, it is clear that an additional factor must be impressed upon the controller so that it can maintain a different setting of the inlet valve in spite of the fact that the liquid level is to be brought back to the original datum. This additional factor is of the nature of an integral of an error with respect to time so that controllers depending upon such an additional factor are usually known by the general term of proportional integral controllers. The additional factor may approximate to an integral with respect to time of the actual error or deviation from the datum value at any time, in which case, the controller is truly a proportional integral controller. However, there are controllers in which the additional factor is of the nature of an integral with respect to time of an empirical error not dependent upon the actual error. This form of proportional integral controller is sometimes referred to as a proportional resetting controller.

It is found that proportional integral controllers have a tendency to hunting, that is to say, that the resultant liquid level varies successively above and below the datum level but tending all the time towards this datum value. In order to overcome this draw-back, it is possible to introduce into the controller a factor depending upon the rate of change of the liquid level with respect to time, and this factor causes any change in liquid level to be opposed. The greater the rate at which the liquid level changes, the greater is this differential or derivative factor which therefore assists or opposes the proportional control according to the sense in which the liquid level is changing. Such a form of controller, usually called now-a-days a proportional integral plus derivative controller, is fundamentally a stable form of controller and the three control factors can be written in the standard equation:

$$I = k_1\theta + k_2\int\theta.dt + k_3 d\theta./dt$$

Where $\theta$=the deviation or error at any time, and I=output from the controller.

The object of the present invention is to provide a controller in which the first of these factors, that is the proportional factor, and if desired also the integral factor and the derivative factor are all derived from electrical quantities produced by suitable electric and electromagnetic components.

Thus, according to the present invention, the physical quantity to be controlled, such as the level of a liquid in a tank, is measured by an electrical transmitter arranged to yield an electric current whose value varies with the magnitude of the variable physical quantity and the current so obtained is caused to affect directly or indirectly a power receiver connected to the controlled member, for example, a liquid outlet valve, whose adjustment effects the control of the variable physical quantity and also the current is employed to establish an additional current component which acts upon the power receiver and thereby causes the latter to operate the controlled member in the sense necessary to restore the magnitude of the variable physical quantity towards its datum value. In order to bring the variable quantity to its datum value, the most satisfactory arrangement is to establish an additional current component which represents a true integral with respect to time of the actual deviation of the variable quantity from its datum value. As already mentioned, a controller dependent only upon proportional and integral factors may be unstable in that excessive correction may cause the state of equilibrium to be overshot and the system to hunt. In order to overcome this drawback and cause the system to operate in a stable manner, yet a further component is applied to the power receiver which component conforms with the rate of change of the variable quantity and is so applied as to cause the adjustment of the controlled member to be made in the necessary direction to oppose the action of the controller in restoring the variable quantity to its datum value.

The preferred arrangement for deriving the integral component includes a pair of photo-electric cells arranged to be differentially illuminated by a source of light controlled by a shutter actuated by an electrical instrument movement responsive to the current derived from the transmitter. If the photo-electric cells are connected as the adjoining arms of a bridge and the output of the bridge applied to charge the grid condenser of an electron discharge tube, the anode current of the tube can be made to represent within practical limits, the integral with respect to time of the deviation of the variable quantity from its datum value and that current is then superimposed on the transmitter current which is applied to the power receiver.

Then the differential or derivative component may be obtained by passing the transmitter current through a resistance so that the potential across it is proportional to the variable physical quantity and by connecting a differentiating circuit across that resistance in such a way that a differential factor appears in the grid circuit of the same electron discharge tube and a similar component appears in the anode current of the tube.

By varying the potential derived from the last-mentioned resistance, the constant of the differential component may be varied and by changing the intensity of the source of illumination for the photo-electric cells, the constant of the integral component may also be varied. This arrangement has the advantage that either may be varied without disturbing or interfering with the adjustment of the other.

In order that the invention may be clearly understood and readily carried into effect, three examples of controllers in accordance with the invention will now be described with reference to the accompanying drawing, which is a schematic diagram of the components and circuit connections of a preferred form of the invention.

It will be assumed that the controller is designed to maintain the level of a liquid, which may be oil, in a reservoir R. Also in all of the examples, the controlled member is a valve V controlling the outflow of liquid at the bottom of the reservoir R while it is assumed that the rate of flow of liquid into the reservoir R through an inlet pipe P is a variable quantity determined by conditions external to the control system so that, in fact, the equilibrium resulting from equal rates of inflow and outflow of liquid is disturbed from time to time so as to cause the level of the liquid surface in the reservoir R to be at least temporarily changed from its datum level which in the drawing is shown at D.

The deviation of the liquid level in the tank R from the datum level is transmitted to establish an electric current which is proportional to the level of the liquid in the tank. The details of such a transmitter are shown in diagrammatic form.

The transmitter is shown as having parts in two flame-proof casings T, and the circuit arrangement is similar to that disclosed in British Patent No. 589,423. However, other forms of transmitter may be employed such as that disclosed in British specification No. 265,012. Whatever form the transmitter takes, however, it is operated in accordance with the liquid level and provides an output current whose magnitude corresponds to the liquid level.

It may be stated briefly that in the form illustrated a float F on the surface of the liquid in the tank R is connected by a cord 1 to a pulley 2 which the cord encircles. The cord is weighted at 3 so that if the liquid level rises or falls, the pulley 2 is rotated by a corresponding amount. The transmitter also comprises the movement of a moving coil electrical meter having permanent magnets 4 and a moving coil 5. The moving coil 5 and a current indicating instrument 6 are connected in series with the anode circuit of a triode electron tube 7 and its source of high tension supply as well as the distant or remote apparatus connected by the conductors 8. In the diagram, the anode current supply is obtained from the secondary winding 9 of a transformer 10 fed from an alternating current source 11, the current being rectified by a bridge-connected rectifier 12. As in British Patent No. 589,423, another secondary winding 13 of the transformer 10 feeds a potential-dividing resistance 14 through a contact rectifier 15. The positive and negative terminals of the resistance 14 are connected respectively to two contacts 16, 17, rigidly supported from the pulley 2 but insulated from one another. The mid point of the resistance 14, being the point of zero potential, is connected to the cathode 18 of the triode 7. The moving coil 5 bears a contact arm 19 which plays between the contacts 16, 17 and is connected through a resistance 20 to the control grid 21 of the triode 7. A grid condenser 22 connected between the grid 21 and cathode 18 serves to maintain the charge which the grid 21 receives when the contact arm makes contact with either of the contacts 16, 17.

The characteristics of the triode 7 and the values of the resistance 20 and condenser 22 are such that the apparatus operates as follows: If the liquid level in the tank R rises, the pulley 2 is rotated in a counterclockwise direction by a corresponding amount and the contact 16 touches the contact arm 19 and consequently the condenser 22 receives a positive charge from the resistance 14 at a rate depending upon the resistance 20. Thus, the grid 21 is positively charged resulting in the anode current flowing through the coil 5 being increased and the result is that the coil 5 is deflected in a direction to move the arm 19 away from the contact 16. This goes on as the contact 16 moves round following the contact 19, but when the contact 16 comes to rest, the arm 19 floats slightly away from the contact 16 whereupon the charge on the condenser 22 leaks away and contact is again made between 16 and 19 thus causing the arm 19 to float in a position corresponding to that of the contact 16 and the corresponding current flowing through the coil 5 can thus be made proportional to the amount that the pulley 2 has been turned and therefore to the liquid level in the tank R. Thus, the operation is very similar to that described in British Patent No. 589,423.

In the example shown in the drawing, the anode current of triode 7 energizes control coil 38 of a known form of electro-pneumatic power receiver for operating the outlet control valve V, although other forms of power device could be used, such as a reversible electric motor. The outlet control valve V has its rod 86 connected to an air operated diaphragm 87 operated to close the valve by air pressure above the diaphragm in a closed chamber 88. This is balanced by a compression spring 89 pressing upwards on the under surface of the diaphragm 87. Coil 38 is carried by pivoted lever 93 and a counter-balancing force is applied to lever 93 by a spring 90 which, upon opening of the valve V, is stressed by a lever 91 pivoted at 92 and connected to the spring 90 at one end and to the valve rod 86 at the other end, so that as the valve opens, the pull on the pivoted arm 93 increases.

The pressure air is supplied through an inlet pipe 94 to a valve casing 95 and flows to the closed chamber 88 through a pipe 96 controlled by the lower member 97 of a double valve. This valve is actuated by a bellows 98, the upper part of which is carried by a fixed bracket 99, and the lower part of which is attached to the valve spindle 100. An air nozzle 101 of fine bore leads from the space within the bellows 98 and air is supplied to the nozzle 101 through a long pipe of fine bore 102 leading out of the air supply pipe 94.

The upper valve member 103 on the same spindle as the member 97 controls an outlet from the inside of the valve casing 95 to atmosphere. The end of the pivoted arm 93 is formed as a blade 104 extending over in close proximity to the outlet of the nozzle 101. In the balanced condition, air escapes from the nozzle 101 at a certain speed past the blade 104 but causes the bellows 98 to be partially expanded with the valve members 97, 103, in an intermediate position, allowing air pressure from the pipe 94 to be partly throttled before reaching the pipe 96 and allowing some air to escape to atmosphere past the valve member 103. Thus, the pressure in the chamber 88 above the diaphragm 87 is balanced by the pressure of the spring 89 and holds the valve V in the adjusted position.

Assume, however, that the current in the coil 38 increases, the lever 93 is rocked counterclockwise so that the blade 104 moves slightly away from the nozzle 101. This allows the pressure in the bellows 98 to fall somewhat, so that the bellows closes, partially closing the valve member 97 and opening the valve member 103. Therefore, the air supply to the pipe 96 is more fully throttled and there is a greater escape to the atmosphere so that the pressure on the top of the diaphragm 87 decreases and the spring 89 opens the valve V to allow of an increased outflow from the tank R. When the valve V is opened, the lever 91 is also rocked clockwise, the spring 90 stressed to balance the pull of the coil 38.

The anode current from the transmitter flows by way of conductor 105 and conductor 106 direct to the coil 38 and back through the conductor 107 to the cathode of the triode 7 so that the current in the coil 38 is at all times proportional to the liquid level and when it increases, it causes the valve V to be opened as described above.

In series with the coil 38 is a movement 108 of an electric current measuring instrument consisting of a moving coil with permanent magnets 109. The moving coil carries a light shutter 110 which is controlled in such a manner that light from a convenient lamp 111 falls differentially upon a pair of photo-electric cells 112, 113, in proportion to the output current from the transmitter. The shutter 110 cooperates with a fixed screen 114 having apertures 115, 116 so that when the liquid level is at the datum level, the shutter 110 is in the central position shown in the drawing and the cells 112, 113 are equally illuminated through the apertures 115, 116 by the lamp 111. If, however, the liquid level falls, the light falling upon the cell 112 is increased by the shutter 110 moving downwards more fully to open the aperture 115 and the light upon the cell 113 is decreased in proportion by the shutter 110 partly obscuring the aperture 116. Conversely, if the liquid level rises, the light falling on the cell 113 is increased relatively to that falling on the cell 112.

The two photo-electric cells 112, 113 are connected in series to form two arms of a four-arm bridge, the remaining arms of which consist of resistances 117, 118 of equal value. The centre point of the two cells 112, 113 is connected through a fixed resistance 119 to one terminal of a grid condenser 120 and also to the control grid 121 of a tridoe 122 while the centre point between the resistances 117, 118, is connected to the opposite terminal of the grid condenser 120 and to the cathode 123 of the triode 122 through a further resistance 124 and a cathode biassing resistance 125. A source of direct potential is connected across opposite junctions of the bridge and is derived from an alternating current source 126 through a transformer 127 and a rectifier 128. When the bridge becomes unbalanced, the unbalance current charges grid condenser 120 to a voltage the value of which is dependent upon the value of the unbalance current and the time during which it flows. The polarity of the charge on condenser 120 will depend upon the direction of unbalance of the bridge.

The triode 122 receives its anode potential from an alternating current source 129 through a transformer 130 and bridge-connected rectifier 131, and its anode current flows by way of conductors 132, 133 through the coil 38 in the same direction as the output from the transmitter.

The condenser 120 acts as a storage condenser for integrating the unbalance current of the bridge which is proportional, at any instant, to the deviation of the liquid level in the tank R from the datum level so that the anode current of the triode 122 applied to the coil 38 introduces into the control of the valve V a true integral factor with respect to time. The arrangement of the shutter 110 is such that a fall in the liquid level in the tank R changes the anode current of the triode 122 so as to close the valve V and conversely the valve tends to be opened when the liquid level rises above the datum level. This additional integral factor therefore, tends to restore the liquid level to the datum. When the datum level is reached, the current from the transmitter corresponds to its nominal value, causing the shutter 110 to take up its central position as shown in the drawing with the cells 112, 113 equally illuminated. However, the grid condenser 120 has acquired a charge during the operation as already explained and the anode current of the triode 122 is maintained at a new value which holds the valve V at a setting corresponding to the new rate of liquid flow into the tank R which is maintained until the rate of inflow through the pipe P is again changed.

In order to introduce into the controller a factor depending upon the rate of change of the liquid level with respect to time, a differentiating electrical network is included in the path between the transmitter and the coil 38 which results in the grid 121 of the triode 122 having its potential further modified according to the first differential of the current from the transmitter which is proportional to the liquid level.

In the drawing, this network is shown as a variable tap resistance 134 in series with the transmitter and the coil 38 so that the current proportional to the liquid level flows in this resistance. The resistance 124 and a condenser 135 in series are connected in parallel with a variable portion of the resistance 134 so that one end of the resistance 134 is connected to the lower end of the biassing resistance 125 and the condenser 135 is connected to the cathode end of the grid condenser 120.

Clearly, at any instant, the potential across the resistance 134 is proportional to the liquid level and the effect of the differentiating network just described is that a potential proportional to the first differential of the current from the transmitter is developed across the resistance 124 which is in the grid circuit of the triode 122. This results in varying the anode current of the tube 122 in addition, according to the rate of change of the liquid-level and the sense of this effect is arranged to be such as to reset the outlet valve V so as to oppose the change in liquid level.

A valuable feature of the system is that the circuit constants $k_1$, $k_2$, $k_3$, in the equation already given may be varied independently without the one affecting the other so that an adjustment of one constant does not necessitate any compensation of another. The lamp 111 is shown as an electric lamp with a variable resistance 136 in circuit with its source of supply enabling the brightness of the lamp to be varied. This variation provides an adjustment of the integral constant $k_2$. The differential constant $k_3$ may be varied by adjustment of the tap on resistance 134. A variable resistance 137 is also provided in shunt to coil 38 to control the throttling range of the controller and this enables the proportional constant $k_1$ to be adjusted.

For convenience, all the apparatus associated with the movement 108, the photo-electric cells 112, 113, the triodes 7 and 122 and their components may be enclosed in a flame-proof casing similar to the casing T.

We claim:

1. In a regulator system in which the magnitude of a physical condition is subject to variation from a datum value and in which the magnitude of the same physical condition may be varied by control means having a movable member, the combination of a transmitter responsive to said physical condition and producing an electric current whose value varies with the magnitude of said condition, a current operated control device connected to operate said movable member and being energized by current from said transmitter, electric means controlled by said transmitter for establishing an additional current component when the magnitude of said physical condition departs from said datum value, said additional component conforming with the integral with respect to time of the actual deviation of the magnitude of said physical condition from its datum value, said electric means comprising a balanced bridge circuit having two photo-cells connected in adjacent arms thereof, a condenser connected to be energized through a high resistance from said bridge, a vacuum tube relay controlled by the voltage across said condenser, and means responsive to said condition, upon departure thereof from said datum value, to energize said cells differentially and thereby unbalance said bridge and means for supplying said additional current component to energize said current operated control device in the same direction as the current from said transmitter.

2. An electrically-actuated controller according to claim 1 and including means responsive to the magnitude of said condition for applying to the energizing circuit of said control device a further component of current which conforms with the rate of change of the magnitude of the variable physical condition and is applied in a direction opposite to the current from said transmitter.

3. A system according to claim 1 and including a differentiating circuit for deriving a voltage conforming with the first differential of the deviation of said transmitter current from its datum value, and means for superimposing said voltage upon the control circuit of said vacuum tube relay.

4. In a regulator system in which the magnitude of a physical condition is subject to variation from a datum value and in which the magnitude of the same physical condition may be varied by control means having a movable member, the combination of a transmitter responsive to said physical condition and producing an electric current whose value is proportional to the magnitude of said condition, a circuit arrangement for producing a current component conforming with the integral with respect to time of the actual deviation of the magnitude of said physical condition from its datum value, said circuit arrangement comprising a bridge circuit having two photo-cells connected in adjacent arms thereof, means for supplying a polarizing voltage to said cells, means responsive to the current from said transmitter for controlling the differential illumination of said cells in accordance with the deviation from its datum value of the current from said transmitter, a condenser connected to be charged by the out-of-balance current of said bridge to a voltage representing the integral with respect to time of the deviation of the current from said transmitter, and a vacuum tube relay having its input circuit controlled by the voltage across said condenser and producing in its output circuit the required current component; and a current-operated control device connected to operate said movable member and connected for energization by the sum of the current from said transmitter and said integral current component.

5. A system according to claim 4, in which said means for controlling the differential illumination of the photocell comprises an electrical measuring instrument energized by said transmitter current and having a moving element, a source of illumination, and shutter means actuated by said moving element for controlling the proportion of the light from said source falling on each of said photo-cells.

6. A system according to claim 5 wherein the moving element of said measuring instrument comprises a moving coil connected to be energized by said transmitter current, and wherein said shutter is positioned midway between said photocells when said transmitter current is at its datum value, said shutter being operative upon deviation of said transmitter current from its datum value to vary the amount of light transmitted to said cells in opposite directions.

7. A system according to claim 4 and including means for adjusting the intensity of illumination of said photo-cells and thereby varying the magnitude of the integral current component in relation to that of the proportional current component.

8. A system according to claim 4 and including means for applying to the energizing circuit for said control device a derivative current component which conforms with the rate of change of the magnitude of said proportional current and is applied in a direction opposite to the proportional current component.

9. A system according to claim 4 and including a differentiating electrical network connected in the path of the proportional current component and deriving a voltage proportional to the first derivative of said proportional current, and a connection for supplying said derivative voltage to the input circuit of said vacuum tube relay.

10. A system according to claim 9 and including a resistance connected in series with said condenser in the input circuit of said vacuum tube relay, and in which said connection applies said derivative voltage across said resistance, whereby the voltage across said resistance and across said condenser are algebraically additive.

11. A system according to claim 9 and including a resistance connected in the circuit of said proportional current component, and wherein said differentiating network is energized by voltage derived from said resistance, and including means for varying the value of said derived voltage.

12. An integrating circuit arrangement comprising a bridge circuit having two photo-cells connected in adjacent arms thereof, means for supplying a polarizing voltage to said cells, means for controlling the differential illumination of said cells in accordance with the deviation from its datum value of a variable physical condition, a condenser connected to be charged by the out-of-balance current of said bridge to a voltage representing the integral with respect to time of the deviation of the current from said transmitter, and a vacuum tube relay having its input circuit controlled by the voltage across said condenser and producing in its output circuit a current having a value proportional to the integral with respect to time of the deviation of magnitude of said physical condition from its datum value.

13. An integrating circuit according to claim 12 wherein said means for controlling the differential illumination of said cells comprises a movable shutter normally positioned midway between said cells and controlling the amount of light admitted to said cells, and means responsive to said variable physical condition for shifting said shutter to one side or the other of said normal position in accordance with an increase or decrease in the magnitude of said condition from its datum value.

14. In a regulator system in which the magnitude of a physical condition is subject to variation from a datum value and in which the magnitude of the same physical condition may be varied by control means having a movable member, the combination of a transmitter responsive to said physical condition and producing an electric current whose value is proportional to the magnitude of said condition, a circuit arrangement for producing a current component conforming with the integral with respect to time of the actual deviation of the magnitude of said physical condition from its datum value, said circuit arrangement comprising a normally balanced four-arm bridge arrangement having a source of polarizing voltage connected between two diagonal terminals thereof and a null circuit connected between the two remaining diagonal terminals, means responsive to the proportional current from said transmitter for unbalancing said bridge in accordance with the deviation of said proportional current from its datum value, a condenser connected to be charged by the current in the null circuit of said bridge to a voltage representing the integral with respect to time of the deviation of the proportional current from its datum value, and a vacuum tube relay having its input circuit controlled by the voltage across said condenser and producing in its output circuit the required current component; and a current-operated control device connected to operate said movable member and connected for energization by the sum of the current from said transmitter and said integral current component.

WILLIAM THOMAS MARCHMENT.
JAMES REILLY BOUNDY.
STEPHEN ARCHBOLD BERGEN.

REFERENCES CITED

The following references are of record in the file of this patent:

UNITED STATES PATENTS

| Number | Name | Date |
|---|---|---|
| 1,497,401 | Boddie | June 10, 1924 |
| 2,117,894 | Lenehan | May 17, 1938 |
| 2,172,487 | Wasserlein | Sept. 12, 1939 |
| 2,173,810 | Taylor | Sept. 19, 1939 |
| 2,175,985 | Callender et al. | Oct. 10, 1939 |
| 2,268,285 | Ivanoff | Dec. 30, 1941 |
| 2,282,726 | Jones | May 12, 1942 |
| 2,300,537 | Davis | Nov. 3, 1942 |
| 2,312,711 | Harrison | Mar. 2, 1943 |
| 2,313,079 | Lilja | Mar. 9, 1943 |
| 2,390,793 | Jones | Dec. 11, 1945 |